Figure 5:
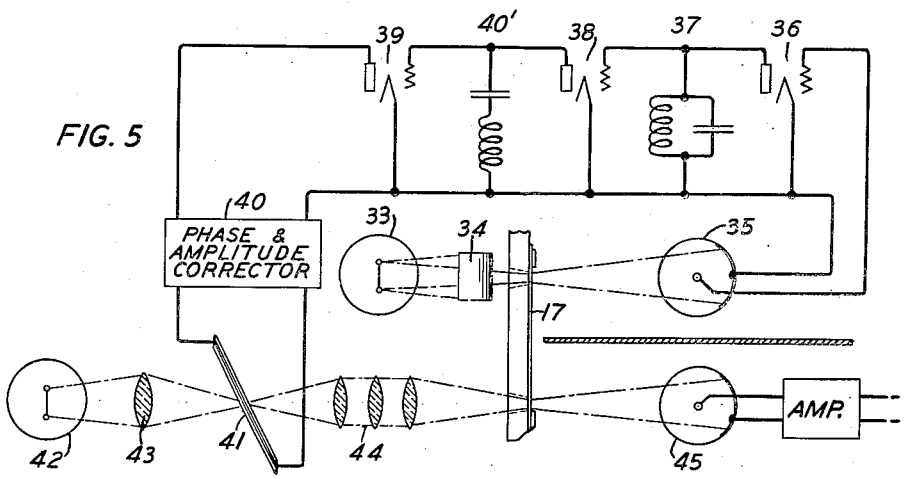

May 7, 1935.  E. H. SMYTHE  2,000,198
SOUND AND PICTURE SYSTEM
Filed Nov. 14, 1933  2 Sheets-Sheet 1
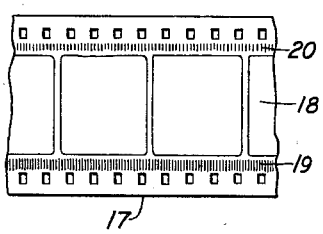
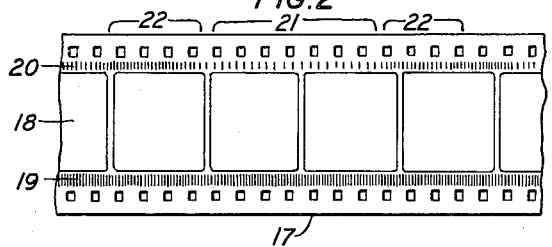
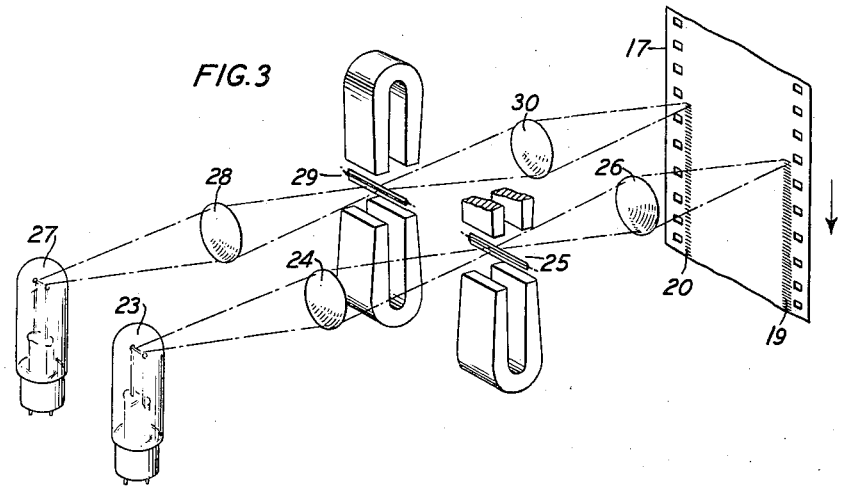
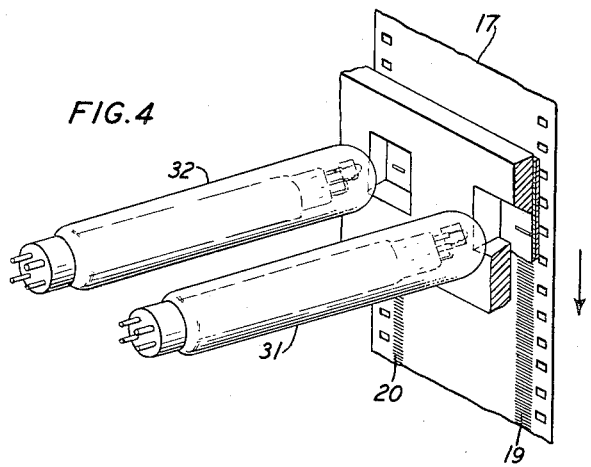
INVENTOR
E. H. SMYTHE
BY
G. H. Heydt
ATTORNEY May 7, 1935.  E. H. SMYTHE  2,000,198

SOUND AND PICTURE SYSTEM

Filed Nov. 14, 1933  2 Sheets-Sheet 2

INVENTOR
E. H. SMYTHE
BY
G. H. Huydt
ATTORNEY

Patented May 7, 1935

2,000,198

UNITED STATES PATENT OFFICE 2,000,198

SOUND AND PICTURE SYSTEM

Edwin H. Smythe, Evanston, Ill., assignor to Bell Telephone Laboratories, Incorporated, New York, N. Y., a corporation of New York Application November 14, 1933, Serial No. 697,903

9 Claims. (Cl. 179—100.3)

This invention relates to sound picture systems, and more particularly to a method and apparatus for maintaining a constant and uniform velocity of movement of the sound record film relative to the translating line of light.

In my copending application, Serial No. 697,901, filed Nov. 14, 1933, there is disclosed a photographic sound recording and reproducing system in which irregularities of the sound record movement due to the drive side and load side disturbances are compensated for, and relatively uniform movement of the sound record secured, by converting such irregularities of motion as are ordinarily communicated to the film into forces that operate upon the translating point and continuously shift its position longitudinally with respect to the direction of the film movement in accordance with these irregularities of motion. In the system of my copending application referred to, the velocity irregularities that are compensated for are those which are present in the sprocket that drives the film at or in close proximity to the translating point.

It is assumed in the copending application referred to that the velocity variations of the film at the translating point are truly represented by the velocity variations of the sprocket that drives the film or the drum over which the film passes at the translating point; and this is a correct assumption with respect to those disturbances which are introduced into the film movement as a result of non-uniformity in the rotation of the various elements included in the mechanical train by means of which the film is driven. But in addition to these irregularities, the film in its movement may still have imposed upon it slight velocity variations, such for instance as are introduced as a result of the irregularities of engagement of the sprocket teeth with the film perforations.

It is the object of the present invention to compensate for all of the irregularities that are present in the film movement; and this object is accomplished by so organizing the system that the compensating shift of the translating line of light is controlled immediately by the velocity variations of the film itself rather than intermediately by the velocity variations in the drum or sprocket which drives the film. In attaining this object in accordance with the present invention the sound record film carries not only the ordinary sound track but is also provided with an additional control or reference track. This control or reference track may be disposed in any convenient position upon the film strip, as for instance, along the other side of the central or picture-carrying portion of the strip in a position corresponding to that of the sound track along the opposite side of the picture portion; or, if desired, it may be located immediately alongside the sound track.

Although in the broader aspects of the invention the control or reference track may be placed upon the film at any time and in any convenient manner, as by being imprinted on the film in the process of manufacture, in the preferred embodiment, it is formed upon the film by the action of light simultaneously with the recording of the sound track. While the light valve or light controlling device responsive to the sound to be recorded is making the sound track record, another light valve or light controlling device actuated by a constant frequency oscillator is recording the reference track. This oscillator is so adjusted as to produce a sinusoidal wave of a frequency relatively high compared with the periodicity of the highest disturbing frequency that is to be compensated for. If the highest disturbing frequency is assumed to be the 96-cycle flutter introduced by the sprocket teeth and film perforation engagement, the frequency recorded upon the reference track may be, say, 2,000 cycles per second; although a considerably lower or higher frequency may be employed, if desired.

The film driving mechanism of the recorder or reproducer is constructed and adapted to impart to the sound record film as uniform a velocity as may conveniently be attained, but need not include the ordinarily used refinements for suppressing the minor velocity variations. Any periodical departure from absolutely uniform velocity in the movement of the film in the recorder produces a corresponding variation in the spacing of the cross-bars or light and dark spaces of the recorded reference frequency wave on the reference track, the cross-bars being more closely spaced in the less-than-average velocity part of the periodical velocity variation of the film, and being less closely spaced in the more-than-average velocity part of the periodical variation.

In reproducing the sound record from a film upon which a reference track has been formed, the reproducing system is so organized that a fixed or immovable line of light that traverses the reference track acts through the medium of a photoelectric or other light sensitive cell, in association with an amplifier, resonant circuit and rectifier with properly designed phase and amplitude compensating network, to control the position of the line of light that passes through the sound track. The shifting of the sound track scanning beam under the control of the fixed reference track scanning beam compensates for the velocity variations of the reproducer; and also, when the reference track has been formed in the recording of the film, for the velocity variations of the recorder as well.

Figure 6:
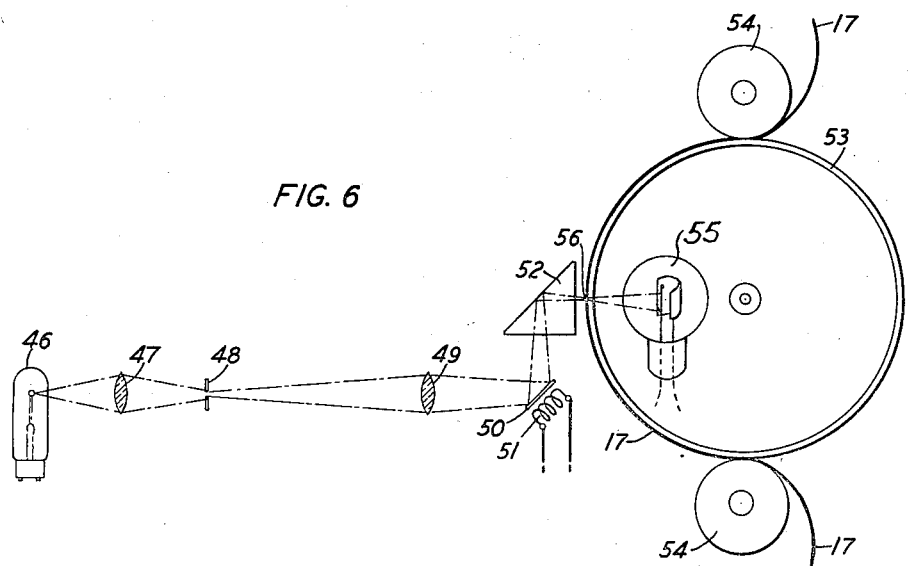

The invention will be more particularly described in connection with the appended drawings, in which Fig. 1 represents a short piece of sound picture film carrying the reference track in addition to the usual sound track; Fig. 2 shows a piece of sound picture film in which the cross-bars of the reference track are unevenly spaced as a result of velocity variation of the film at the time of recording; Figs. 3 and 4 represent schematically arrangements by means of which the sound and reference tracks may be recorded upon the film; Fig. 5 represents diagrammatically the mechanical and electrical arrangement of the reproducer whereby the compensating shift of the sound track scanning beam is effected under the control of the reference track, a light valve being used as the agency for effecting the shift; and Fig. 6 is a schematic representation of an arrangement employing a tilting mirror or oscillograph for effecting the compensating shift of the light at the translating point.

Referring to the drawings, Figs. 1 and 2 illustrate sections of a sound picture film 17 with the picture frames 18 occupying the central portion of the strip, and the sound track 19 extending in the usual manner along one side of the central picture strip. The film strip 17 also carries a reference or control track 20 which is illustrated as extending along the other side of the picture strip 18, but which may, if desired, be formed in any other convenient location, as for instance, alongside the sound track 19. In the fragment of film strip shown in Fig. 1, the cross-bars of the reference track, recorded upon the film, as will be described, through the agency of a constant frequency oscillator and light valve or similar device, are represented as being equally spaced. In the fragment of film illustrated in Fig. 2 the cross-bars of the reference track 20 are represented as being less closely spaced in the region 21 and more closely spaced in the regions 22. The spacing represented in Fig. 1 is such as results from a uniform velocity of movement of the film past the reference track recording light, and the spacing represented in Fig. 2 is that which results from a varying velocity of movement of the film strip past the reference track recording light.

Figs. 3 and 4 indicate schematically the manner in which the reference track 20 may be recorded on the film at the time when the sound track 19 is recorded. The sound track recording system is indicated as consisting of an exciting lamp 23, a condensing lens 24, a light valve 25 and an objective lens 26. Similarly the reference track recording apparatus consists of the exciting lamp 27, condensing lens 28, light valve 29 and objective lens 30. The light valves 25 and 29 may be generally of the type disclosed in the article by Perreault, at page 412 of the August, 1932 issue of Bell Telephone Laboratories Record, Vol. X, No. 12. Each valve consists of a pair of tightly stretched diamagnetic conducting ribbons lying in an intense transverse magnetic field and defining a narrow slit between their proximate edges, the slit extending transversely with respect to the length of the photographic film strip 17. The light slit in the light valve 25 may, in accordance with the usual practice, be of such dimensions as to project upon the sound track 19 a line of light ½ mil or less in height. The light slit in the light valve 29 may be of such dimensions as to project, if desired, upon the reference track 20 a line of light somewhat greater in height.

Fig. 4 represents schematically the use of gas discharge lamps for furnishing the light for recording the sound track and reference track upon the film. These lamps may be of the negative glow type or the positive glow type, as desired, the lamp 31 being used for making the sound track record and the lamp 32 for making the reference track record. As is customary in systems employing glow lamps for recording, the lamps are positioned close to the film and the limitation of the recording light to a thin line is effected by means of a fine transverse slit very close to and just out of contact with the film, and covered with a very thin plate of quartz. It is, of course, obvious that where desired one of the tracks may be recorded upon the film by means of a light valve and the other by means of a glow lamp.

The circuits for operating light valves or gas discharge lamps for effecting the proper modulation of the light for recording sound upon film are well known in the art, and it is therefore not thought necessary to illustrate or describe them.

The circuit and apparatus for shifting the position of the sound track scanning beam in the reproducer under the control of the reference track on the film is shown in Fig. 5. Light from the filament of the exciting lamp 33 passes through the cylindrical condensing lens 34 and is projected upon the reference track of the film 17 in the form of a thin bright line of light. Inasmuch as the frequency recorded upon the reference track may be such a relatively low frequency as 2,000 cycles per second, the line of light focussed on the reference track may, if desired, be several times as thick as the line of light which scans the sound track, thus permitting a greater quantity of light to pass. The light that passes through the reference track is modulated at a frequency which depends upon the spacing of the cross-bars as determined by the velocity at which the film moved in the recorder, and also by the rate at which these cross-bars pass the scanning line as determined by the velocity of film movement in the reproducer. This frequency modulated light correspondingly excites the photoelectric or other light sensitive cell 35.

The output of the photoelectric cell after amplification in the amplifier 36 passes through a resonant circuit 37, which is tuned to be resonant at a frequency of, say, 2,200 cycles per second, and which has a very nearly straight line characteristic between, say, 1,800 and 2,200 cycles. In passing this resonant circuit the frequency variations representing the velocity variations of the recorder and reproducer are translated into amplitude variations on account of the increasing attenuation of the resonant circuit, in a substantially straight line ratio, for all frequencies lower than its resonant frequency and in the neighborhood of the average frequency of 2,000 cycles per second of the reference track. The varying frequencies, which now are of varying amplitudes, are rectified in the detector or demodulator 38. The rectified currents, which correspond in frequency with the rate of variation from uniform velocity and in amplitude with the amplitude of this variation are preferably subjected to the action of an equalizer in the form of a tuned circuit 40' tuned to a frequency representing the difference between the resonant frequency of the circuit 37 and the frequency of the oscillator that records the reference track. Under the conditions that have been assumed, this is the difference between 2,200 and 2,000, or 200 cycles per second. The equalized output of the rectifier 38 is amplified in the amplifier 39 and passes through the phase and amplitude corrector 40 to the ribbons of the light valve 41. The corrector 40 may include a bridged condenser of large capacity to correct for phase shift; and it may also be designed, in accordance with well-understood practice, to perform the function which is performed by the equalizer 40′ and permit that element to be dispensed with. As a result the ribbons of the light valve are caused to produce a movement of the sound track scanning line corresponding in phase and amplitude with the phase and amplitude of departure of the velocity of the film in recording and reproducing from its average velocity.

The corrected current representing the film velocity variations passes in parallel through the two ribbons of the valve so that both are moved equally in the same direction. Light from the exciting lamp 42 is focussed by the condensing lens 43 upon the slit between the two ribbons and the image of the slit is focussed by the objective lens system 44 upon the sound track of the film 17. The optical leverage is such that as the light valve moves the slit up the image of the slit is moved down, or in the direction in which the film is moving, and vice versa. After passing through the sound track the beam of light falls upon the photoelectric cell 45, and the output of this cell acts through the usual train of amplifiers and other devices to operate the loud speaker.

The amplitudes of variation of film velocity from uniform movement in recording and reproducing, although important from the standpoint of the production of perceptible "flutter" or other objectionable effect in the reproduced sound, are not of themselves of a great magnitude in terms of change of the linear velocity of film movement. Therefore, for the most part, they may be compensated for by a movement of the scanning line amounting to only a small fraction of an inch, say, 15 or 20 mils, along the sound track. Inasmuch as the frequency of the velocity variations in the film that are to be compensated for do not exceed between 100 and 200 cycles per second, the ribbons of the light valve 41 may be made longer than those of the ordinary light valve and may be tuned to a relatively low resonant frequency, thus producing a greater range of movement of the slit with the expenditure of less electrical energy. As an example, the light valve ribbons may be, say, 2 inches long instead of their usual ½-inch length and may be tuned to a resonant frequency of 1,000 cycles or less as against their usual resonant frequency of some 10,000 cycles. If the ribbons are ½ mil thick and are, say, 26 mils wide, with an optical ratio of 1:1 between the slit and film the line of light may have a movement along the film of about 25 mils which is sufficient to compensate for all of the ordinary recording and reproducing velocity variations. If a greater length of movement of the scanning line is desired, it may readily be secured by obvious changes in the dimensions of the light valve ribbons, or by increasing the optical leverage between the light slit and the sound track.

Fig. 6 illustrates a modification in which the compensating shift of the line of light along the sound track is effected by an oscillating mirror. Light from the exciting lamp 46 is focussed by the condensing lens 47 upon the stationary light slit 48. The light from the light slit passes through the objective lens 49 and falls upon the oscillograph mirror 50, the rotational movement of which is schematically represented as being produced by the energizing winding 51 that is assumed to be traversed by the fluctuating currents from the detector 38 (see Fig. 5) after proper compensation with respect to phase and amplitude in a properly designed equalizer and corrector 40. The light that falls upon the oscillating mirror 50 is reflected from the internal reflecting surface of the prism 52 onto the sound track of the film 17 as the film passes over a portion of the periphery of the rotating drum or cylinder 53. The film may be controlled in its engagement and disengagement with the cylinder 53 by the pressure rollers 54. The cylinder 53 is so constructed that the portions of it which underlie the sound track and reference track of the film 17 are cut away, in accordance with well-understood practice, so that light passes unobstructed through the sound track to the photoelectric cell 55; and also through the reference track to the associated photoelectric cell, not shown. As the mirror 50 tilts in response to the velocity compensating currents controlled by the reference track, the image of the light slit 48 focussed upon the sound track at a point 56 is moved lengthwise of the sound track to compensate for the velocity irregularities introduced in the recording and reproducing operations.

In order to present more clearly the operation of the compensating system of the invention, it may first be assumed that the movement of the film past the two translating points or lines of light in the recording operation has not been at a perfectly uniform speed, as a result of velocity variations having been superposed upon the uniform rate of movement. The result on the recorded reference track is illustrated in Fig. 2. During the intervals in the movement of the film past the translating point where the velocity has been greater than average, the cross-bars in the reference track produced by the response of the recording light to the constant frequency oscillator are more widely spaced, as indicated in the region designated by the numeral 21 in Fig. 2; and during those intervals during which the film moves at a less-than-average velocity past the translating point, the cross-bars on the reference track 20 are more closely spaced, as indicated in the regions designated by the numerals 22 in Fig. 2.

Let it be assumed that in the reproduction of the film with such velocity irregularities recorded upon the reference track the film driving mechanism operates in such a manner as to draw the film past the reference track scanning beam at a perfectly uniform velocity. It is evident that the movement of the reference track at a perfectly uniform velocity past the fixed scanning beam is accompanied by the generation of a lower frequency in the reference pick-up circuit for those portions of the film which have moved at a greater-than-average velocity through the recorder, and the reproduction of a higher frequency in the reference pick-up circuit for those portions of the film that have moved through the recorder at a lower-than-average velocity. The resultant fluctuating current representing amplitude and rate of the velocity variations of the film movement in the recorder is carried through the light valve in such a way that as the current increases with the increased frequency resulting from the closer spacing of the bars in the reference track due to a lower-than-average velocity of film movement in recording, the sound track scanning beam is shifted in the direction of the movement of the film, thus producing a relatively less rapid movement between the film and the sound track translating point; and so that, when the current through the compensating light valve decreases as the result of a lower frequency in the reference circuit due to the wider spacing of the cross-bars in the reference track that results from a higher-than-average velocity of the film in recording, the sound track scanning beam is shifted oppositely to the direction in which the film is moving so as to increase the relative velocity of movement between the film and the translating point. Therefore, whatever is the instantaneous rate of movement of the film past the line of light of the sound track scanning beam in recording, this same instantaneous rate of movement is repeated between the film and the automatically shifted line of light in reproducing. Consequently all of the recording irregularities are compensated for and the reproduced sound is a faithful replica of the sound that made the record.

Again, let it be assumed that the velocity of movement of the film in the recording operation has been perfectly uniform, but that the velocity of film movement in the reproducing apparatus is irregular. The uniform recording velocity causes the cross-bars of the constant reference frequency in the reference track to be uniformly spaced, as indicated in Fig. 1. In the reproducing operation the velocity irregularities of the reproducing apparatus convert the constant frequency recorded upon the reference track into a varying frequency in the reference pick-up circuit. The greater-than-average velocity half of the irregularity cycle superimposed by the reproducing apparatus raises the frequency of the wave, and the less-than-average velocity half of the cycle lowers the frequency of the wave picked up in the reference circuit. The acceleration of the film above its uniform velocity therefore, due to the operation of the resonant circuit, increases the amplitude of the current in the output of the reference circuit and causes a corresponding shift of the sound track scanning beam in the direction of the movement of the film, thus producing a relatively less rapid movement between the film and the translating point. Therefore, the relative rate of movement between the sound track translating line of light and the film is compensated and remains uniform. The reverse action takes place during the less-than-average velocity half of the irregularity cycle, the amplitude of the current in the output of the reference circuit decreasing, and the compensating light valve shifting the sound track scanning beam in a direction opposite that in which the film is moving, thus increasing the relative velocity of movement between the film and the translating point. Consequently, the relative velocity of movement between the two is maintained uniform.

Inasmuch as the system operates, as has been shown, to compensate either for film velocity irregularities introduced in the recording operation or film velocity irregularities introduced in the reproducing operation, it follows that both sorts of irregularity are represented in the rate of movement of the reference track crossbars past the associated stationary scanning beam; and that the sound track scanning beam, controlled in position by this rate of movement, will constantly be so shifted as to compensate for the composite of whatever irregularities may have been introduced in recording and reproducing.

Obviously the advantages of the invention with respect to automatic velocity variation compensation may be realized in the reproduction of sound recorded on a sound record film, whether the reference or control track has been recorded or placed on the film at the time the sound was recorded thereon, or whether it is in the form of a uniformly spaced series of bars or variations placed or imprinted upon the sound film at some other time to serve as an index of the velocity of movement of the film past the translating point. In the latter case the pre-imprinted reference or control track may operate through its associated instrumentalities to effect a compensating shift of the recording line of light to produce relatively uniform velocity between the film and the translating point, as disclosed in my copending application Serial No. 697,901, filed Nov. 14, 1933.

What is claimed is:

1. A sound translating system arranged to minimize relative motion between sound translating elements having two sound translating means for translating a sound track for sound reproduction and a reference track for registering momentary film irregularities in velocity of a frequency which causes noticeable sound pitch variation, and means for shifting the sound track translating means commensurate with the irregularities registered by said reference track.

2. A sound film provided with a sound track for sound reproduction and a velocity reference track, individual translating means for said tracks, and means controlled by said reference track for shifting the sound track translating means responsive to momentary irregular film variations.

3. A sound film provided with a constant frequency reference track and having an associated sound translating point, and means controlled by said reference track for synchronizing irregular movements of the film and changes in location of the point of sound translation.

4. A sound film carrying a velocity reference track and a sound track, translating means coacting with said sound track at a translating point, and means controlled by said velocity reference track for changing the position of said translating point corresponding to momentary irregular movements of the film.

5. The method of compensating for velocity variations in the movement past a translating point of a sound record film provided with a reference track, which consists in directly converting velocity variations of the reference track into corresponding electrical variations, and utilizing said electrical variations to constantly adjust the position of the translating point.

6. The method of producing a sound film provided with a velocity controlling reference track, which consists in photographically recording upon the film a sound track by means of light varied in accordance with sound, and simultaneously recording upon the film a reference track the characteristics of which are constantly varied in accordance with the variations of velocity of the film as the sound track is recorded thereon.

7. In a sound film recording and reproducing system, means for simultaneously recording upon a photographic film a sound track and a constant frequency reference track, and means controlled by said reference track in reproduction for causing the sound track translating point to be shifted an amount commensurate with the irregularities in the movement of the sound track past its translating point in recording.

8. In a sound film reproducing system, a sound record film bearing thereon a sound track and a reference track representing a constant frequency record, translating means having a translating point coacting with said sound track arranged to shift said translating point, and means under the control of said reference track for controlling said translating means for changing the position of the translating point proportional to momentary variations in film velocity of a nature to cause sound distortion.

9. In a sound film reproducing system, a sound record film having a sound track and a reference track, translating means for said sound track having a translating point at which the record upon said sound track is translated into electrical currents varying in accordance with the recorded sound, translating means for said reference track having a stationary translating point at which the variations recorded upon the reference track are converted into corresponding electrical current variations, and means under the control of said reference track translating means for controlling said sound track translating means to shift the position of the translating point at the sound track.

EDWIN H. SMYTHE.